United States Patent
Ryyppö et al.

(10) Patent No.: US 12,117,363 B2
(45) Date of Patent: Oct. 15, 2024

(54) VALUES FOR DRIVETRAIN

(71) Applicant: ABB Schweiz AG, Baden (CH)

(72) Inventors: Tommi Ryyppö, Helsinki (FI); Jari Jäppinen, Helsinki (FI); Jan Westerlund, Helsinki (FI)

(73) Assignee: ABB Schweiz AG, Baden (CH)

( * ) Notice: Subject to any disclaimer, the term of this patent is extended or adjusted under 35 U.S.C. 154(b) by 933 days.

(21) Appl. No.: 17/084,740

(22) Filed: Oct. 30, 2020

(65) Prior Publication Data

US 2021/0102868 A1    Apr. 8, 2021

Related U.S. Application Data

(63) Continuation of application No. PCT/EP2019/061583, filed on May 6, 2019.

(30) Foreign Application Priority Data

May 7, 2018   (EP) ..................................... 18170995

(51) Int. Cl.
*G01M 13/02*     (2019.01)
*B60W 30/188*    (2012.01)
(Continued)

(52) U.S. Cl.
CPC ........ *G01M 13/025* (2013.01); *B60W 30/188* (2013.01); *B60W 30/20* (2013.01); *G06F 30/15* (2020.01)

(58) Field of Classification Search
CPC .. G01M 13/025; B60W 30/188; B60W 30/20; G06F 30/15
(Continued)

(56) References Cited

U.S. PATENT DOCUMENTS

| 10,650,176 B2 * | 5/2020 | James ..................... G06F 30/17 |
| 2007/0028220 A1 | 2/2007 | Miller et al. |

(Continued)

FOREIGN PATENT DOCUMENTS

| CN | 102269975 A | 12/2011 | |
| CN | 104142664 A * | 11/2014 | ........... G05B 13/026 |
| DE | 102006017824 A1 | 10/2007 | |

OTHER PUBLICATIONS

Sehab_2011 (Electric Vehicle Drivetrain: Sizing and Validation Using General and Particular Mission Profiles, Procedings of the 2011 IEEE International Conference on Mechatronics Apr. 13-15, 2011, Istanbul, Turkey) (Year: 2011).*

(Continued)

*Primary Examiner* — Brian S Cook
(74) *Attorney, Agent, or Firm* — Leydig, Voit & Mayer, Ltd.

(57) ABSTRACT

When a gateway, which provides one or more drivetrain domain specific knowledge services and include one or more simulation tools, receives a request relating to a drivetrain, the request containing identification information identifying one or more components of the drivetrain, and possibly one or more operation conditions, the gateway retrieves, based on the identification information, component information on one or more components of the drivetrain, the component information indicating for each component a component type. The gateway also retrieves, based on one or more component types in the component information and received one or more operation conditions, if any received, one or more values. Then the gateway uses at least the retrieved one or more values as input for a simulation; and outputs a simulation result for the drivetrain and/or for one or more of components the drivetrain.

20 Claims, 2 Drawing Sheets

(51) Int. Cl.
  *B60W 30/20* (2006.01)
  *G01M 13/025* (2019.01)
  *G06F 30/15* (2020.01)

(58) Field of Classification Search
  USPC .............................................................. 703/8
  See application file for complete search history.

(56) References Cited

U.S. PATENT DOCUMENTS

2015/0347670 A1    12/2015    James
2017/0147719 A1*    5/2017    Martinez Canedo ... G06F 30/00

OTHER PUBLICATIONS

European Patent Office, Office Action in European Patent Application No. 19724130.0, 11 pp. (Aug. 16, 2021).

Gallego-Calderon et al., "Electromechanical Drivetrain Simulation," *Proceedings of 9th PhD Seminar on Wind Energy in Europe*, 6 pp. (Sep. 18-20, 2013).

Li et al., "Development and Application of Vehicle Powertrain Model Library," *Computer Simulation*, 23(9): 2 pp. (Sep. 30, 2006).

European Patent Office, International Search Report & Written Opinion issued in corresponding Application No. PCT/EP2019/061583, mailed Aug. 19, 2019, 20 pp.

European Patent Office, Extended Search Report issued in corresponding Application No. 18170995.7, mailed Oct. 30, 2018, 16 pp.

Bachinger et al., "A novel drivetrain modelling approach for real-time simulation," Mechatronics, vol. 32, 2015, pp. 67-78.

Sehab et al., "Electric Vehicle Drivetrain: Sizing and Validation Using General and Particular Mission Profiles," Proceedings of the 2011 IEEE International Conference on Mechatronics, Apr. 13-15, 2011, Istanbul, Turkey, pp. 77-83.

Sureshbabu et al., "Real-Time Simulation with Powertrain-in-the-Loop," Dec. 31, 2000, pp. 799-804, retrieved from the Internet: https://ac.els-cdn.com/S1474667017392431/1-s2.0-S1474667017392431-main.pdf?_ tid=0d1fc3f0-f7a0-4ac3-be1c-a2b3cfcf4466&acdnat=1537521146_a2af745596510e269a417f4b440ff4af.

* cited by examiner

VALUES FOR DRIVETRAIN

The present invention relates to drivetrains, and more precisely receiving values by simulating one or more drivetrain components.

BACKGROUND ART

It is known that designing a drivetrain is a highly complex engineering task. Further, drivetrain optimisation is performed manually or based on pre-calculated parameters, and although simulation methods are improved, the simulations are still pre-simulations for certain operation points and/or pre-simulating certain fault conditions. Further, the simulations may be based on simplified solutions. For example, Rabia Sehab et al. "Electric vehicle drivetrain: Sizing and validation using general and particular mission profiles", 2011 IEEE International conference on mechatronics (ICM), IEE, 13.4.2011, pages 77-83 discloses a solution in which components are selected/defined for a simplified drivetrain, and the thus formed drivetrain is validated by simulation using pre-simulated cases of European driving cycles which include highway and jam. Bachinger Markut et al. "A novel drivetrain modelling approach for real-time simulation", Mechatronix, vol. 32, pages 67-78 discloses a fixed-time step friction modelling of automotive gear transmissions, verified on an exemplary simplified drivetrain. Hence, there is a need for a mechanism enabling nearly real-time simulation of drivetrains and/or drivetrain components for a variety of purposes.

SUMMARY

An object of the present invention is to provide a near real time simulation results for drivetrains or one or more drivetrain components. The object of the invention is achieved by a method, equipment and a computer program product which are characterized by what is stated in the independent claims. The preferred embodiments of the invention are disclosed in the dependent claims.

A general aspect of the invention uses logically centralized environment, which receives as input identification information of a drivetrain or its component and one or more operation conditions, and based on them retrieves required information, such as information on one or more component types and one or more related values, performs required simulation and outputs the simulation result. This provides a mechanism with which it is, for example, possible to provide the required simulation results without the requester inputting detailed information on the drivetrain or its component.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system or equipment that is configured or configurable to simulate drivetrain and/or its components. Different embodiments and examples are described below using single units and computing device and memory, without restricting the embodiments/examples to such a solution. Concepts called cloud computing and virtualization may be used as well. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment.

Figure 1:
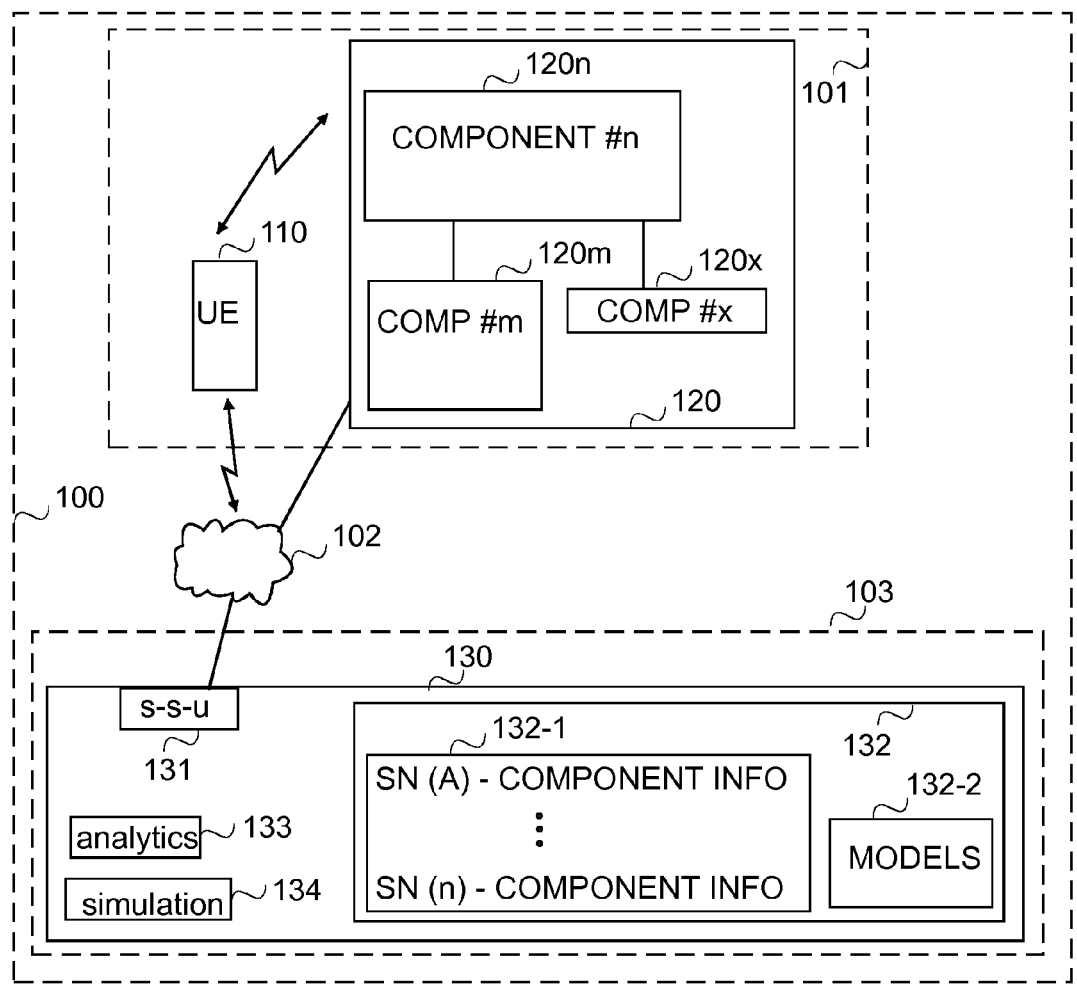
FIG. 1 shows simplified architecture of a system and a block diagram of exemplified equipment.

A general exemplary architecture of a system is illustrated in FIG. 1. FIG. 1 is a simplified system architecture only showing some devices, apparatuses and functional entities, all being logical units whose implementation and/or number may differ from what is shown. The connections shown in FIG. 1 are logical connections; the actual physical connections may be different. It is apparent to a person skilled in the art that the system comprises any number of shown elements, other equipment, other functions and structures that are not illustrated. They, as well as the protocols used, are well known by persons skilled in the art and are irrelevant to the actual invention. Therefore, they need not to be discussed in more detail here.

In the embodiment illustrated in FIG. 1, the system 100 comprises one or more industrial sites 101 (only one illustrated in FIG. 1) connected over one or more networks 102 to a service center 103. The system 100 may implement a concept called Internet of Things, Services and People (IoTSP), in which the industrial site 101 may be configured to act as an edge, and the service center 103 may be configured as a global cloud level 101 forming a level for central management, for example. In such an implementation, sensors measuring and/or collecting different information may be configured to send the data they collect, to the service center. However, any other implementation, including those not utilizing IoTSP, may be used as well.

In the illustrated example the industrial site 101 comprises one or more user apparatuses 110 (only one illustrated in FIG. 1) and one or more drivetrains 120 (only one illustrated in FIG. 1).

The user apparatus 110 is a computing device comprising different user interfaces, such as touch screens, other type of displays, and keypads for example. The user apparatus 110 may be a local service desk, or a factory level service desk, etc., such as a work station or a server, like a cloud server or a grid server. The user apparatus may as well be a remote user's mobile user apparatus comprising, for example, a smartphone application for commissioning, servicing and/or use of drivetrain 120, for example. The user apparatus 110 may be connected to the drivetrain over a wireless connection, including short range wireless communication, such as Bluetooth or near field communication, just to name some examples without limiting to those, and/or over a wired connection. However, the details of the connection bears no significance and are therefore not described in detail herein.

The drivetrain 120 comprises typically several components 120*m*, 120*n*, 120*x* that together form the drivetrain. A non-limiting list of examples of such components include a motor, a pump, a frequency convertor, a transformer, a gearbox, an actuator, and a compressor. Further, a component may comprise one or more components, although not illustrated in FIG. 1. For example, a motor may comprise a rotor, a shaft, bearings, a stator, windings, and a protective relay. The drivetrain 120 comprises one or more interfaces (not depicted in Figure) via which parameters of the drivetrain 120, i.e. its components 120*m*, 120*n*, 120*x* may be adjusted or acquired, and/or the functions of the drivetrain 120 otherwise controlled, locally via the user apparatus 120 and/or directly by the service center 103.

The one or more networks 102 (communications networks) may comprise one or more wireless networks, wherein a wireless network may be based on any mobile system, such as GSM, GPRS, LTE, 4G, 5G and beyond, or a wireless local area network, such as Wi-Fi. Further, the one or more networks 102 may comprise one or more fixed networks.

The service center 103, or corresponding equipment comprises for drivetrain domain specific knowledge services, including simulation services to the drivetrains, a gateway 130 providing a simulation platform, for example. The gateway may be configured to provide for the drivetrain domain specific knowledge services responses to requests by combining values from multiple databases or, as will be described in more detail below, by calculating the values, using one or more simulation tools and input values. The gateway 130, or at least the calculation portion of the gateway may be called a simulation equipment or a simulation engine. The gateway 130 may be any equipment or a computing device comprising memory, or a sub-system (simulation system), comprising computing devices that are configured to appear as one logical gateway (simulation equipment) for user apparatuses, for example.

In the illustrated example, the gateway (simulation equipment) 130 comprises a simulation service unit (s-s-u) 131, which provides an application programming interface to drive train simulations, the application programming interface (service application programming interface) having a defined structure both for requests (calls) it receives and for responses it outputs. Further, the gateway comprises, at least for simulation purposes, in a database 132 (or memory) information 132-1 associating identification information of a drivetrain to its component information, and different model data 132-2. Naturally the information may be used for other purposes and the memory may contain other information, for example data collected from drivetrains. Further, in the illustrated example, the gateway 130 comprises different analytics tools 133 and, for the drivetrain domain specific knowledge services, different simulation tools 134. A simulation tool is simulating one or more technical properties of a drivetrain and/or one or more technical properties of one or more of components forming the drivetrain, and it may output a non-measurable value, which is a value for a physical property in such a location that the value cannot be measured from the real life physical drivetrain. There are no restrictions relating to analytics tools 133 and simulation tools 134, any known or future tool may be used. Further, the internal functionality of the tools bears no significance to disclosed solutions, and therefore the tools are not described in more detail herein.

The database 132 refers herein to a combination of a data storage and a data management system. The data storage may be any kind of conventional or future data repository, including distributed and centralized storing of data, a cloud-based storage in a cloud environment, managed by any suitable management system. The implementation of the data storage, the manner how data is stored, retrieved and updated are irrelevant to the invention, and therefore not described in detail here.

As said above, the database 132 comprises for the simulation services the information 132-1 associating identification information of a drivetrain to its component information. The component information may comprise information on component types for components associated with the identification information. Below term "component type" is used as a synonym to information on component type. Further, one or more values may be given for component types component type specifically, as part of the component information, or as a separate information. For example, based on the component type, one or more of the values may be retrievable from model information 132-2. In addition, information generated by the one or more analytics tool may be associated as value information for the component types or components or drivetrains by means of the identification information. Using a serial number (SN) as an example of identification information, the serial number of the drivetrain can be used for determining motor type, pump type, etc., as will be explained in more detail below. The model data may comprise for each drivetrain, or drivetrain type, detailed information, such as information on manufacturer, size information, software version of installed software, if any, and design data generated. A non-limiting list of examples of the design data includes component dimensions and material properties. Design data may have been generated, for example, by a computer aided design (CAD) during designing the drivetrain, and/or by ERP (Enterprise Resource Planning). For example, a rotating drivetrain is designed with tools based on machine models, such as lumped parameter models, 2 dimensional/3 dimensional finite element analysis (FEA) models as electromagnetical models, computational fluid dynamics (CFD) models, and mechanical models, wherein the models may be coupled models with supply and/or load. Naturally, the model data may comprise corresponding information on components and/or component types.

Figure 2:
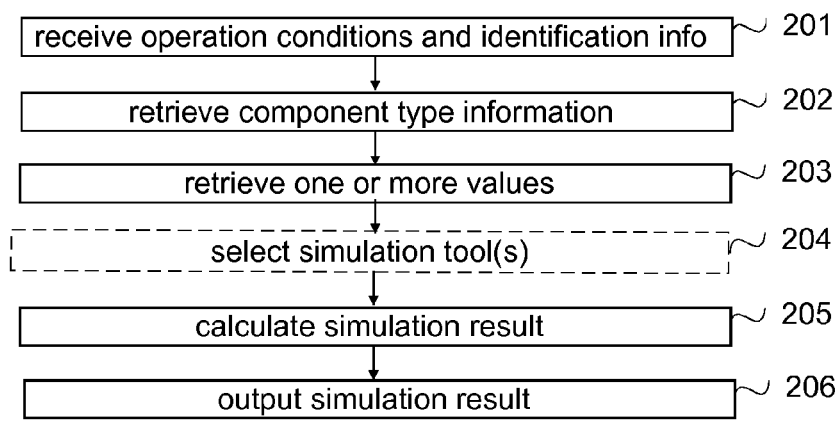
FIG. 2 is a flow chart illustrating functionalities according to an example.

FIG. 2 illustrates an exemplary functionality of the gateway, or more precisely, the functionality of the simulation service unit the gateway comprises, the simulation service unit providing the application programming interface for the service.

Referring to FIG. 2, a request relating to a drivetrain is received in step 201. Depending on implementation, the request may be addressed to a function to be performed, or the function may be included to be part of the request. The function may be indicated by means of a purpose of the simulation, such as "provide commissioning settings", "provide temperature inside a motor", for example. Regardless of what the function (purpose) is and how it is indicated with the request, the received request contains one or more operation conditions and identification information identifying one or more components of the drivetrain. The identification information may be an identifier of the drivetrain, such as a serial number, for example. By means of the serial number of a drivetrain it is easy to determine components belonging to the drivetrain, and identification information of a component, if the request is for a simulation result for a component is not needed. However, if the identification information identifies the component, that identification information can naturally be used. Then in step 202 component information, which indicates for each component in the drivetrain, a component type, is retrieved in step 202 based on the identification information received in step 201.

Once the one or more component types are known, one or more values are retrieved in step 203, based on the one or more component types and the received one or more operation conditions. The values may be retrieved from model data, and/or the component information may comprise one or more of the values. Naturally, if there are analysis and/or measurement data available, one or more values may be retrieved therefrom. The analysis and/or the measurement data may be maintained in, and retrieved from a product data management system, for example.

If the gateway comprises more than one simulation tools, one or more simulation tools to be used are selected in step 204. A proper simulation tool may be selected using at least the component type, possible also using the one or more operation conditions. For example, the simulations tools may comprise component-specific simulation tools, or drivetrain-specific simulation tool(s), simulations tools for certain aggregates of components, and/or purpose-specific simulation tools. Naturally the step is omitted, if only one simulation tool is usable.

The retrieved values are then used as an input to calculate in step 205 a simulation result for the drivetrain and/or for one or more of components. Naturally, one or more of the operation conditions may be used as an input to calculate in step 205 the simulation result, which is then outputted in step 206. The outputted value may then be used for the indicated purpose, as will be described below with further examples.

It should be appreciated that calculating a simulation result may contain a plurality of successive simulations or parallel simulations. For example, for each component a separate simulation tool may be used, and an output of a simulation tool may be used as an input to another simulation tool when successive simulations are used.

As is evident from the above, a digital twin for the drivetrain may be created on a fly for the specific need, and there is no need to determine a digital twin for each drivetrain.

Figure 3:
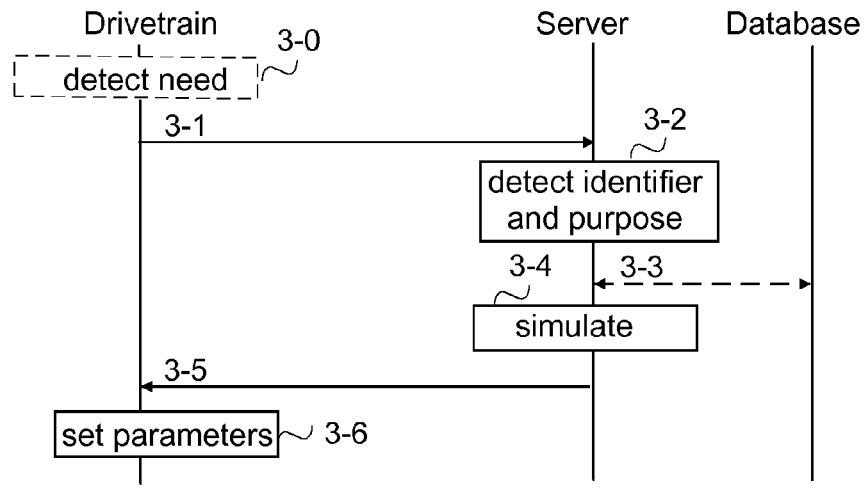
FIGS. 3 and 4 illustrate examples of information exchange and functionalities.
Figure 4:
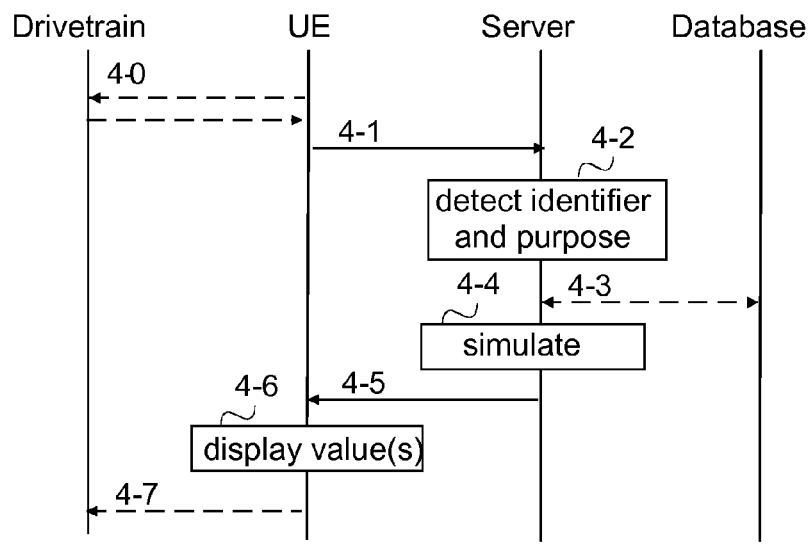

Information exchanges illustrated in FIGS. 3 and 4 provides different use examples. In the example, the gateway (simulation equipment) is illustrated as a separate server, that comprises the simulation service unit, and a database, that comprises the component information and model data, and may comprise also other data.

FIG. 3 illustrate an example of functionalities implemented using machine-to-machine information exchange, i.e. without any user, or user apparatus, involvement, whereas in the example of FIG. 4, a user is involved, at least in monitoring the results.

Referring to FIG. 3, a drivetrain may be configured to send periodically messages to the server via the application programming interface for the service, provided by the simulation service unit, and/or the drivetrain may be configured to monitor its operation and when detecting entering an unknown operational condition, or a fault, or a value not within safety limits, or any other anomaly, etc., to send a message to the server via the application programming interface for the service. For example, machine learning may be utilized for the monitoring. Regardless of the reason, when a need to send a message is detected in point 3-0, the drivetrain sends message 3-1 to the server, the message comprising one or more operation conditions, and identification information. The message may relate to troubleshooting. For example, a temperature of a running motor in the drivetrain may have been too high, and a protective relay shuts the motor down, and that causes the drivetrain to send in message the operation conditions, like the current of the motor was A, running time one hour, temperature exceeded, "how to adjust parameters", and the identification data may be an identifier of the drivetrain (and/or the motor, and/or the protective relay). Other examples include "how to minimize sound level", "how to minimize vibration" and "how to maximize reliability". It should be appreciated that the examples are listed just to illustrate different purposes without limiting the solution to disclosed examples.

The server receives message 3-1, and detects in point 3-2 the identifier and the purpose what for simulation is requested, retrieves (messages 3-3) component types of the motor and the protective relay, possible also from other components, and one or more values, and then performs the simulation in point 3-4. The components may be simulated separately and/or as one or more aggregates of the components, as explained above with FIG. 2. Then the simulation results are outputted by sending new parameter values in message 3-5 to the drivetrain as a response to the request send in message 3-1.

The new parameter values received by the drivetrain in the response are set in point 3-6, and the protective relay allows the drivetrain to start to operate again. In other words, an intelligent protective relay is provided without detailed data on the motor being disposed (delivered) to the drivetrain.

Naturally, any other troubleshooting may be performed correspondingly, when the need arises. In other words, when an anomaly, or a malfunction, is detected, message 3-1 with a request indicating a question "a anomaly/malfunction was detected, is there something to do differently?" is sent with the drivetrain identifier and operation parameters. (Naturally, the request may be sent without operation parameters, in which case measurement values may be used.) Hence, the fault conditions that need simulation result, will be simulated, using actual available inputs, and there is no need to pre-simulate different electrical and mechanical fault conditions. Furthermore, due to the complexity of drivetrains, it is not possible to pre-simulate all possible electrical and mechanical fault conditions, and thereby, when using pre-simulation, a situation may arise when no simulation results are available. However, such a situation will not arise with the disclosed solution.

In another example message 3-1 may comprise the identifier, and indicate "not commissioned", for example by having no operation conditions (empty instead of operation conditions), and a request for commissioning parameters is sent in message 3-1, and commissioning parameters are received in message 3-5, and setting the parameters in point 3-6 commissions the drivetrain. In other words, by sending a mere identifier, such as a serial number of the drivetrain, commissioning parameters of the drivetrain are received.

In an example, the solution may be used for testing of the drivetrain, for example to determine some critical values, such as to calculate bearing critical values. For bearing calculations, operation conditions may include values for one or more of the following: speed range, radial load, housing ambient temperature and housing ambient air velocity.

The disclosed solutions may be used also for optimizing the parameter values component-specifically. For example, a frequency converter may tune itself to operate with a pump with the above disclosed machine-to-machine communication. It is also possible to optimize parameter values to obtain a specific target, such as a maximum power transfer ratio. In such a case, the result, based on optimizing parameter values for each component, will allow optimizing the whole drivetrain, to provide the best possible power transfer ration, without any need to have a table or a database dedicated for that purpose.

Any of the above described examples are usable also with the example of FIG. 4. The example of FIG. 4 differs from the example illustrated in FIG. 3 in that respect that a user apparatus is involved. The user apparatus may comprise a remote assistant tool, or any corresponding tool, that may have been configured to display, for example, a plant in a gradual mode: for example first different portions of the plant, and when a drying plant 1, for example, is selected, then a motor is displayed, when the motor is selected, different information, including simulation results, may be displayed.

Referring to FIG. 4, when a need for simulation is detected, at least identification information, i.e. identifier, is retrieved (messages 4-0) from the drivetrain. The identification information may be an identifier given in a machine readable barcode, such as a QR (Quick Response) code, which is an example of matrix barcode. (A barcode is a machine-readable optical label that contains information about the item to which it is attached.) Other alternatives include a rating plate wherefrom the identifier may be read, and the drivetrain broadcasting its identifier. Any other ways to obtain the identifier may be naturally used. Further, the user apparatus may be configured to retrieve the one or more operations conditions from the drivetrain, and/or one or more measurement result. However, it should be appreciated that the drivetrain, and/or its components may be equipped with sensors that transmit measurement data to cloud, for example, in which case there is no need to retrieve the measurement data. (As is known, time stamps, for example, may be used to match one or more pieces of the measurement data to operation conditions.)

Then the user apparatus (UE) sends message 4-1 comprising at least the operational parameters and the identifier to the server. The server detects in point 4-2 the identifier and the purpose what for simulation is requested. Using as an example of message 4-2 a message that comprises an identifier of the drivetrain, stator's current power and temperature, and a request for rotor's temperature (which cannot be measured), the server retrieves (messages 4-3) component types and one or more values, and then performs the simulation in point 4-4. In the example, the result is a temperature that cannot be measured from the physical component. Then the simulation result is outputted by sending the temperature in message 4-5 to the user apparatus as a response to the request send in message 4-1. The user apparatus then displays in point 4-6 the received temperature. It may be displayed with actual temperature measurements results of other components, and the request 4-1 may be sent at a certain interval, for example the same used in actual measurements.

Further, depending on the purpose, for example, the displayed values, or control commands based on the simulation result, may be sent (one or more messages 4-7) to the drivetrain. The control command may be "take in use new set values comprising A, B, etc." or "start to use for the frequency converter a (new) pulse pattern A and/or (new) switching frequency B", just to list couple examples for illustrative purposes.

As can be seen from the above example, the simulation result outputted via the display may show an inner view of the drivetrain, or its component, like a motor, the inner view comprising a value that cannot be measured from the real life physical drivetrain.

The above principles may be used for maintenance purposes as well, wherein the simulation result may be "if you run the drivetrain, or motor, in the way it is currently run, the time between two consecutive lubrications will be x days but if you run like using the parameters given herein, the time will be x+a days.", and then the user of the user apparatus may cause the parameters to be updated.

As is evident from the above examples, by sending at least the identification information and operation conditions to the application programming interface a wide variety of calculation needs will be served. The simulation result may provide calculation of actual loads on critical components, for example bearings, lifespan prediction of critical components based on actual values, specification of monitoring requirements and maintenance intervals, setting of alarm and trip limits, fast data analysis and feedback from successful commissioning by comparing commissioning values with measured values and simulated values, when values cannot be measured, shaft voltage estimation, motor noise and vibration spectrum estimation, etc. In other words, by means of sending operation conditions and identifying information from the drivetrain it is possible to provide virtual engineering (commissioning, testing, etc.), optimization for different purposes (energy, performance, lifetime, etc.), soft sensing (process variables, such as pump operating point, temperatures of frequency convertor and motor, etc.), predictive maintenance of components (pump, motor, frequency converter, etc.), residual life estimation of components (motor, frequency converter, bearings, stator winding, fan power semiconductors, mechanical parts, etc.), and risk factor estimation. It should be appreciated that the above is a non-limiting list of examples of different uses.

As is evident from the above, there is no need to multiply the model data and simulation models, for example, and thereby there is no need to ensure data integrity between the different copies. In addition, there is no need to define new interfaces, including application programming interfaces, since the solution provides a general use application programming interface.

The steps and related functions described above in FIGS. 2 to 4 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step.

The techniques and methods described herein may be implemented by various means so that equipment/a device/an apparatus configured to support at least partly on what is disclosed above with any of FIGS. 1 to 4, including implementing one or more functions/operations of a corresponding device/equipment described above with an embodiment/example, for example by means of any of FIGS. 1 to 4, comprises not only prior art means, but also means for implementing the one or more functions/operations of a corresponding functionality described with an embodiment/example, for example by means of any of FIGS. 1 to 4, and the device/equipment may comprise separate means for each separate function/operation, or means may be configured to perform two or more functions/operations. For example, one or more of the means and/or the simulation service unit described above may be implemented in hardware (one or more devices), firmware (one or more devices), software (one or more modules), or combinations thereof. For a hardware implementation, the device(s) or apparatus(es) or equipment of embodiments/examples may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, logic gates, other electronic units designed to perform the functions described herein by means of FIGS. 1 to 4, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 5:
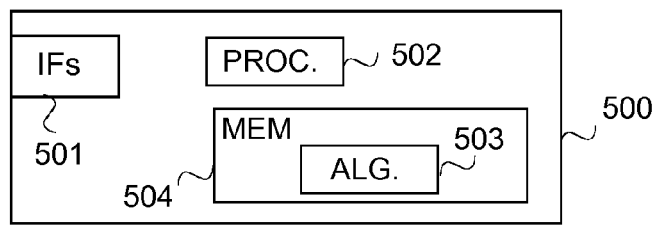
FIG. 5 is a schematic block diagram.

FIG. 5 is a simplified block diagram illustrating some units for equipment 500 configured to provide the gateway (simulation equipment), or a corresponding computing device, comprising at least one or more simulation service units, or corresponding units and sub-units, or application programming interface(s) described above with FIGS. 1 to 4 or corresponding functionality or some of the corresponding functionality if functionalities are distributed in the future. In the illustrated example, the equipment comprises one or more interfaces (IF) 501 for receiving and/or transmitting information from or to other devices, and possibly from or to a user, one or more processors 502 configured to implement the simulation service unit described above with FIGS. 1 to 4, or at least part of corresponding functionality as a sub-unit functionality if distributed scenario is implemented, with corresponding algorithms 503, and one or more memories 504 usable for storing at least computer program code required for the one or more simulation service units or for one or more corresponding units or sub-units, i.e. the algorithms for implementing the functionality. The memory 504 is also usable for storing other possible information, such as the component information and/or the models and/or computer program code required for implementing different simulation and/or analytics tools, for example.

In other words, the gateway (simulation equipment, device, apparatus) configured to provide equipment, or a device/apparatus configured to provide one or more the corresponding functionalities described above with FIGS. 1 to 4, is a computing equipment that may be any apparatus or device or equipment or node configured to perform one or more of the corresponding functionalities described above with an embodiment/example/implementation, and it may be configured to perform functionalities from different embodiments/examples/implementations. The one or simulation service units, as well as corresponding units and sub-units may be separate units, even located in another physical apparatus, the distributed physical apparatuses forming one logical equipment providing the functionality, or integrated to another unit in the same equipment.

The equipment configured to provide the gateway (simulation equipment 9, or a device configured to provide one or more corresponding functionalities may generally include one or more processors, controllers, control units, microcontrollers, or the like connected to one or more memories and to various interfaces of the equipment. Generally a processor is a central processing unit, but the processor may be an additional operation processor. Each or some or one of the units/sub-units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/sub-units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), logic gates and/or other hardware components that have been programmed and/or will be programmed by downloading computer program code (one or more algorithms) in such a way to carry out one or more functions of one or more embodiments/implementations/examples. An embodiment provides a computer program embodied on any client-readable distribution/data storage medium or memory unit(s) or article(s) of manufacture, comprising program instructions executable by one or more processors/computers, which instructions, when loaded into a device, constitute the simulation service unit, or any sub-unit, or corresponding application programming interface. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Further, the equipment configured to provide the gateway (simulation equipment), or a device configured to provide one or more of the corresponding functionalities described above with FIGS. 1 to 4 may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. In other words, the memory, or part of it, may be any computer-usable non-transitory medium within the processor/equipment or external to the processor/equipment, in which case it can be communicatively coupled to the processor/equipment via various means as is known in the art. Examples of an external memory include a removable memory detachably connected to the apparatus, a distributed database and a cloud server. The memory may also store computer program code such as software applications (for example, for one or more of the units/sub-units/algorithms) or operating systems, information, data, content, or the like for the processor to perform steps associated with operation of the equipment in accordance with examples/embodiments.

It will be obvious to a person skilled in the art that, as technology advances, the inventive concept can be implemented in various ways. The invention and its embodiments are not limited to the examples described above but may vary within the scope of the claims.

The invention claimed is:

1. A computer implemented method for a gateway comprising two or more different simulation tools, a simulation tool simulating at least one selected from a group of at least one technical property of a drivetrain, and at least one technical property of one or more of components forming the drivetrain, wherein the drivetrain represents a real life physical drivetrain located in an industrial site, the method comprising:
    receiving, in the gateway, a request relating to the drivetrain, the request indicating a purpose of a simulation for the real life physical drivetrain and containing identification information identifying either the drivetrain or one component of the drivetrain;
    retrieving, based on the identification information, component information on components of the real life physical drivetrain, the component information indicating for each of the components a component type;
    retrieving, based on retrieved one or more component types, one or more values;
    selecting, using at least the component information, amongst the two or more different simulation tools, one or more simulation tools to be used in the simulation for the purpose indicated in the request;
    using at least the retrieved one or more values as input for a simulation, which uses the one or more simulation tools selected to calculate a simulation result with one or more values for the drivetrain; and
    outputting the simulation result with the one or more values as a response to the request.

2. The computer implemented method of claim 1, further comprising:
    detecting that the purpose is to commission the drivetrain;
    using the received identification information for retrieving component information on all components forming the drivetrain; and
    outputting the simulation result with commissioning parameters as the one or more values for the drivetrain.

3. The computer implemented method of claim 1, further comprising:
    receiving in the request one or more operation conditions; and
    retrieving the one or more values based on the one or more component types in the component information and received one or more operation conditions.

4. The computer implemented method of claim 3, further comprising:
    detecting that the purpose is for obtaining one or more non-measurable values for at least the one component, wherein a non-measurable value is a value for a physical property in such a location that the value cannot be measured from the real life physical drivetrain;
    retrieving component information on the at least one component, wherein a non-measurable value is a value for a physical property in such a location that the value cannot be measured from the real life physical drivetrain;
    using as input for the simulation one or more of the received operation conditions and at least a piece of the component information; and
    causing outputting the simulation result with one or more simulated values for the one or more non-measurable values as the one or more values for the drivetrain.

5. The computer implemented method of claim 1, further comprising:
    detecting that the purpose is for troubleshooting;
    retrieving component information on components forming the drivetrain, and corresponding values;
    retrieving measurement results of the drivetrain or receiving measurement results in the request or both retrieving measurement results of the drivetrain and receiving measurement results in the request;
    using also as input for the simulation one or more measurement result; and
    outputting the simulation result with at least one of the following as the one or more values for the drivetrain: indication, which component or settings are causing problems, and one or more new parameter values to be reset.

6. The computer implemented method of claim 1, further comprising:
    detecting that the purpose is for maintenance of at least one component;
    retrieving component information on the at least one component;
    retrieving measurement results of the drivetrain or receiving measurement results in the request or both retrieving measurement results of the drivetrain and receiving measurement results in the request;
    using also as input for the simulation one or more measurement result; and
    outputting the simulation result with one or more maintenance action as the one or more values for the drivetrain.

7. The computer implemented method of claim 1, the method providing an application programming interface for drivetrain domain specific knowledge services.

8. A non-transitory computer readable medium having stored thereon instructions that, when executed by a computing device, which comprises two or more different simulation tools, a simulation tool simulating at least one selected from a group of at least one technical property of a drivetrain and at least one technical property of one or more of components forming the drivetrain, wherein the drivetrain represents a real life physical drivetrain located in an industrial site, cause the computing device to:
    retrieve, in response to receiving a request relating to the drivetrain, the request indicating a purpose of a simulation for the real life physical drivetrain and containing identification information identifying either the drivetrain or one component of the drivetrain, based on the identification information, component information on components of the drivetrain, the component information indicating for each of the components a component type;
    retrieve, based on retrieved one or more component types, one or more values;
    select, using at least the component information, amongst the two or more different simulation tools, one or more simulation tools to be used in the simulation for the purpose indicated in the request;
    use at least the retrieved one or more values as input for a simulation, which uses the one or more simulation tools selected to calculate a simulation result with one or more values for the drivetrain; and
    output the simulation result with the one or more values as a response to the request.

9. A gateway comprising:
at least one processor;
and at least one memory including computer program code and comprising two or more different simulation tools, a simulation tool simulating at least one selected from a group of at least one technical property of a drivetrain and at least one technical property of one or more components forming the drivetrain, wherein the drivetrain represents a real life physical drivetrain located in an industrial site,
wherein the at least one memory and the computer program code are configured to, with the at least one processor, cause the gateway to perform at least one of the following:
retrieving, in response to receiving a request for commissioning the real life physical drivetrain, the request containing identification information identifying either the drivetrain or one component of the drivetrain, based on the identification information, component information on all components forming the real life physical drivetrain, the component information indicating for each component a component type; retrieving, based on the retrieved component types in the component information, values; selecting, using at least the component information, amongst the two or more different simulation tools, one or more simulation tools for a purpose of commissioning the real life physical drivetrain; using the retrieved values as inputs to the one or more simulation tools selected; performing simulation; and outputting commissioning parameters for the real life physical drivetrain as a simulation result;
retrieving, in response to receiving a request for troubleshooting the real life physical drivetrain, the request containing identification information identifying either the drivetrain or one component of the drivetrain, based on the identification information, component information on all components forming the real life physical drivetrain, the component information indicating for each component a component type; retrieving, based on the retrieved component types in the component information, values; retrieving measurement results of the real life physical drivetrain or receiving measurement results in the request or both retrieving measurement results of the real life physical drivetrain and receiving measurement results in the request; selecting, using at least the component information, amongst the two or more different simulation tools, the one or more simulation tools for a purpose of troubleshooting the real life physical drivetrain; using one or more measurement results and the retrieved values as inputs to the one or more simulation tools selected; performing simulation; and outputting as a simulation result at least one of the following: indication, which component or settings in the real life physical drivetrain are causing problems, and one or more new parameter values to be reset in the real life physical drivetrain;
retrieving, in response to receiving a request for maintenance of at least one component in the real life physical drivetrain, the request containing identification information identifying either the real life physical drivetrain or one component of the real life physical drivetrain, based on the identification information, component information on the at least one component comprised in the real life physical drivetrain, the component information indicating for each of the at least one component a component type; retrieving, based on the retrieved at least one component type in the component information, one or more values; selecting, using at least the component information, amongst the two or more different simulation tools, the one or more simulation tools for a purpose of maintenance of the at least one component in the real life physical drivetrain; retrieving measurement results of the real life physical drivetrain or receiving measurement results in the request or both retrieving measurement results of the real life physical drivetrain and receiving measurement results in the request; using one or more measurement result and the retrieved one or more values as inputs to the one or more simulation tools selected; performing simulation; and outputting as a simulation result one or more maintenance action; and
retrieving, in response to receiving a request for obtaining one or more non-measurable values for at least one component in the real life physical drivetrain, the request containing one or more operation conditions and identification information identifying either the real life physical drivetrain or a component of the real life physical drivetrain, wherein a non-measurable value is a value for a physical property in such a location that the value cannot be measured from the real life physical drivetrain, based on the identification information, component information on the at least one component, the component information indicating for each of the at least one component a component type; selecting, using at least the component information, amongst the two or more different simulation tools, the one or more simulation tools for a purpose of obtaining the one or more non-measurable values for at least one component; retrieving, based on the retrieved at least one component type in the component information and received one or more operation conditions, one or more values; using one or more of the received operation conditions and the retrieved one or more values as inputs to the one or more simulation tools selected; performing simulation; and causing outputting a simulation result, that comprises one or more simulated values for the one or more non-measurable values in the real life physical drivetrain.

10. The gateway of claim 9, wherein the at least one memory and the computer program code are further configured to, with the at least one processor, cause the gateway to retrieve, in response to receiving in the request one or more operation conditions, the one or more values based on the one or more component types in the component information and received one or more operation conditions.

11. The non-transitory computer readable medium of claim 8, having stored thereon further instructions that, when executed by the computing device, cause the computing device to:
retrieve, in response to receiving a request relating to the drivetrain, the request indicating a purpose of a simulation and containing identification information identifying the drivetrain or one or more components of the drivetrain, based on the identification information, component information on the one or more components of the drivetrain, the component information indicating for each of the one or more components a component type;
retrieve, based on the retrieved one or more component types, one or more values;
use at least the retrieved one or more values as input for a simulation using the one or more simulation tools selected to calculate a simulation result with one or more values for the drivetrain; and output the simulation result with the one or more values as a response to the request.

12. The non-transitory computer readable medium of claim 8, having stored thereon further instructions that, when executed by the computing device, cause the computing device to:
use, in response to detecting that the purpose is to commission the drivetrain, the received identification information for retrieving component in-formation on all components forming the drivetrain; and
output the simulation result with commissioning parameters as the one or more values for the drivetrain.

13. The non-transitory computer readable medium of claim 8, having stored thereon further instructions that, when executed by the computing device, cause the computing device to:
retrieve, in response to receiving in the request one or more operation conditions, the one or more values based on the one or more component types in the component information and received one or more operation conditions.

14. The non-transitory computer readable medium of claim 8, having stored thereon further instructions that, when executed by the computing device, cause the computing device to:
retrieve, in response to detecting that the purpose is for obtaining one or more non-measurable values for at least the one component, wherein a non-measurable value is a value for a physical property in such a location that the value cannot be measured from the real life physical drivetrain, component information on the at least one component, wherein a non-measurable value is a value for a physical property in such a location that the value cannot be measured from the real life physical drivetrain;
use as input for the simulation one or more of the received operation conditions and at least a piece of the component information; and
cause outputting the simulation result with one or more simulated values for the one or more non-measurable values as the one or more values for the drivetrain.

15. The non-transitory computer readable medium of claim 8, having stored thereon further instructions that, when executed by the computing device, cause the computing device to:
retrieve, in response to detecting that the purpose is for troubleshooting, component information on components forming the drivetrain, and corresponding values;
retrieve one or more measurement results of the drivetrain;
use also as input for the simulation the one or more measurement results; and
output the simulation result with, as the one or more values for the drivetrain, at least one selected from a group of an indication, which component or settings are causing problems, and one or more new parameter values to be reset.

16. The non-transitory computer readable medium of claim 8, having stored thereon further instructions that, when executed by the computing device, cause the computing device to:
retrieve, in response to detecting that the purpose is for troubleshooting, component information on components forming the drivetrain, and corresponding values;
use also as input for the simulation one or more measurement result received in the request; and
output the simulation result with, as the one or more values for the drivetrain, at least one selected from a group of an indication, which component or settings are causing problems, and one or more new parameter values to be reset.

17. The non-transitory computer readable medium of claim 8, having stored thereon further instructions that, when executed by the computing device, cause the computing device to:
retrieve, in response to detecting that the purpose is for troubleshooting, component information on components forming the drivetrain, and corresponding values;
retrieve one or more measurement results of the drivetrain;
use also as input for the simulation the one or more measurement result retrieved and one or more measurement result received in the request; and
output the simulation result with, as the one or more values for the drivetrain, at least one selected from a group of an indication, which component or settings are causing problems, and one or more new parameter values to be reset.

18. The non-transitory computer readable medium of claim 8, having stored thereon further instructions that, when executed by the computing device, cause the computing device to:
retrieve, in response to detecting that the purpose is for maintenance of at least one component, component information on the at least one component;
retrieve one or more measurement results of the drivetrain;
use also as input for the simulation the one or more measurement result retrieved; and
output the simulation result with one or more maintenance action as the one or more values for the drivetrain.

19. The non-transitory computer readable medium of claim 8, having stored thereon further instructions that, when executed by the computing device, cause the computing device to:
retrieve, in response to detecting that the purpose is for maintenance of at least one component, component information on the at least one component;
use also as input for the simulation one or more measurement result received in the request; and
output the simulation result with one or more maintenance action as the one or more values for the drivetrain.

20. The non-transitory computer readable medium of claim 8, having stored thereon further instructions that, when executed by the computing device, cause the computing device to:
retrieve, in response to detecting that the purpose is for maintenance of at least one component, component information on the at least one component;
retrieve one or more measurement results of the drivetrain;
use also as input for the simulation the one or more measurement result retrieved and one or more measurement result received in the request; and
output the simulation result with one or more maintenance action as the one or more values for the drivetrain.

* * * * *